United States Patent
Takahashi et al.

(10) Patent No.: US 7,080,395 B2
(45) Date of Patent: Jul. 18, 2006

(54) INFORMATION PROCESSOR, INFORMATION PROCESSING METHOD AS WELL AS BROADCASTING SYSTEM AND BROADCASTING METHOD

(75) Inventors: Yasushi Takahashi, Chiba (JP); Yoshihito Fujiwara, Kanagawa (JP)

(73) Assignee: Sony Corporation, Tokyo (JP)

( * ) Notice: Subject to any disclaimer, the term of this patent is extended or adjusted under 35 U.S.C. 154(b) by 1029 days.

(21) Appl. No.: 09/899,656

(22) Filed: Jul. 5, 2001

(65) Prior Publication Data

US 2002/0056106 A1 May 9, 2002

(51) Int. Cl.
*H04N 5/445* (2006.01)
*H04N 7/10* (2006.01)
*G06F 3/00* (2006.01)
*G06F 13/00* (2006.01)
*H04N 7/25* (2006.01)

(52) U.S. Cl. .............. 725/44; 725/32; 725/53; 348/569; 348/460; 348/563

(58) Field of Classification Search .......... 348/569, 348/460–461, 563–565, 476, 421, 731, 906; 725/32, 41–43, 44, 53, 60; 345/636, 638
See application file for complete search history.

(56) References Cited

U.S. PATENT DOCUMENTS

| | | | | |
|---|---|---|---|---|
| 5,410,326 A * | 4/1995 | Goldstein | .................... | 348/734 |
| 5,521,979 A | 5/1996 | Deiss | .......................... | 380/20 |
| 5,596,373 A | 1/1997 | White | ........................ | 348/569 |
| 5,724,472 A | 3/1998 | Abecassis | .................... | 386/52 |
| 5,731,844 A | 3/1998 | Rauch | ........................ | 348/569 |
| 5,768,539 A | 6/1998 | Metz | ............................ | 348/7 |
| 5,801,785 A | 9/1998 | Crump | ........................ | 348/567 |
| 5,822,014 A | 10/1998 | Steyer | ........................ | 348/563 |
| 5,822,123 A * | 10/1998 | Davis et al. | .................. | 725/43 |
| 5,850,218 A | 12/1998 | LaJoie | ........................ | 348/906 |
| 5,892,508 A | 4/1999 | Howe | ........................ | 345/327 |
| 5,973,682 A | 10/1999 | Saib | ............................ | 345/327 |
| 6,018,372 A | 1/2000 | Etheredge | .................... | 348/569 |
| 6,025,837 A * | 2/2000 | Matthews et al. | .......... | 715/721 |
| 6,035,304 A | 3/2000 | Machida | ........................ | 348/6 |
| 6,230,324 B1 * | 5/2001 | Tomita et al. | ................ | 725/51 |
| 6,278,493 B1 * | 8/2001 | Takahashi et al. | .......... | 348/569 |
| 2003/0056216 A1 * | 3/2003 | Wugofski et al. | ............. | 725/46 |

FOREIGN PATENT DOCUMENTS

JP 11075127 * 8/1997

* cited by examiner

*Primary Examiner*—Wesner Sajous
(74) *Attorney, Agent, or Firm*—Frommer Lawrence & Haug LLP; William S. Frommer; Thomas F. Presson

(57) ABSTRACT

There is provided an information processor and an information processing method for effectively utilizing EPG data. Identification codes for identifying specific character parts such as names of the cast of a program described in a description text describing the detail of the program in EPG data are inserted within the description text and are transmitted by a transmitter. Based on the identification codes inserted in the EPG data, the specific character parts are sampled from the description text and predetermined processing steps are performed based on the sampled result in a receiver. That is, the display color of the specific character parts is differentiated from that of the other part in displaying the description text on a monitor for example. Or, a list of the names of the cast of the program is displayed as the sampled specific character parts and when the user selects a certain player, EPG of the program in which the player appears is displayed.

14 Claims, 13 Drawing Sheets

FIG. 1

■ EXAMPLE OF EPG OF SATELLITE DIGITAL BROADCASTING

PRESENT STATE OF PROGRAM DESCRIPTION DATA
(EXAMPLE OF MOVIE PROGRAM)

PROGRAM TITLE : TWISTER } TITLE

DESCRIPTION OF PROGRAM (TEXT) :
THE FURY OF TORNADO RAGING IN THE MIDWEST OF THE
US AND RECKLESS SCIENTISTS WHO STAND AGAINST IT.
TACKLING THIS PICTURE IS THE "JURASSIC PARK"
COMBINATION OF STEVEN SPIELBERG AS EXECUTIVE
PRODUCER AND MICHAEL CRICHTON AS SCREENPLAY.
DIRECTED BY YAN DE VONN WHO HAD DIRECTED "THE SPEED".   } DESCRIPTION TEXT
A PANIC SPECTACLE MAKING THE MOST USE OF THE LATEST
CG AND SFX IS PLAYED.
IMPASSIONED PERFORMANCE OF BILL PAXTON AND HELEN
HUNT IS ALSO WORTHY OF SEEING. FOR YOUNG COUPLES TO
FAMILIES. '96, THE US, COLOR/STEREO, 113 MIN.

FIG. 2

PRESENT STATE OF EXPRESSION ON SCREEN

THE FURY OF TORNADO RAGING IN THE MIDWEST OF THE
US AND RECKLESS SCIENTISTS WHO STAND AGAINST IT.
TACKLING THIS PICTURE IS THE "JURASSIC PARK"
COMBINATION OF STEVEN SPIELBERG AS EXECUTIVE
PRODUCER AND MICHAEL CRICHTON AS SCREENPLAY.
DIRECTED BY YAN DE VONN WHO HAD DIRECTED "THE SPEED".
A PANIC SPECTACLE MAKING THE MOST USE OF THE LATEST
CG AND SFX IS PLAYED.
IMPASSIONED PERFORMANCE OF BILL PAXTON AND HELEN
HUNT IS ALSO WORTHY OF SEEING. FOR YOUNG COUPLES TO
FAMILIES. '96, THE US, COLOR/STEREO, 113 MIN.

CREATING EPG abcdefghijklmnopqrstuvwxyzABCDEFGHIJKLM
NOPQRSTUVWXYZ....... — EPG DATA (DESCRIPTION TEXT)

⇩

INSERTION OF IDENTIFICATION CODE

SAMPLING SPECIFIC CHARACTER PART

1 : xyz    2 : PQR

⇩

EXPRESSING EPG

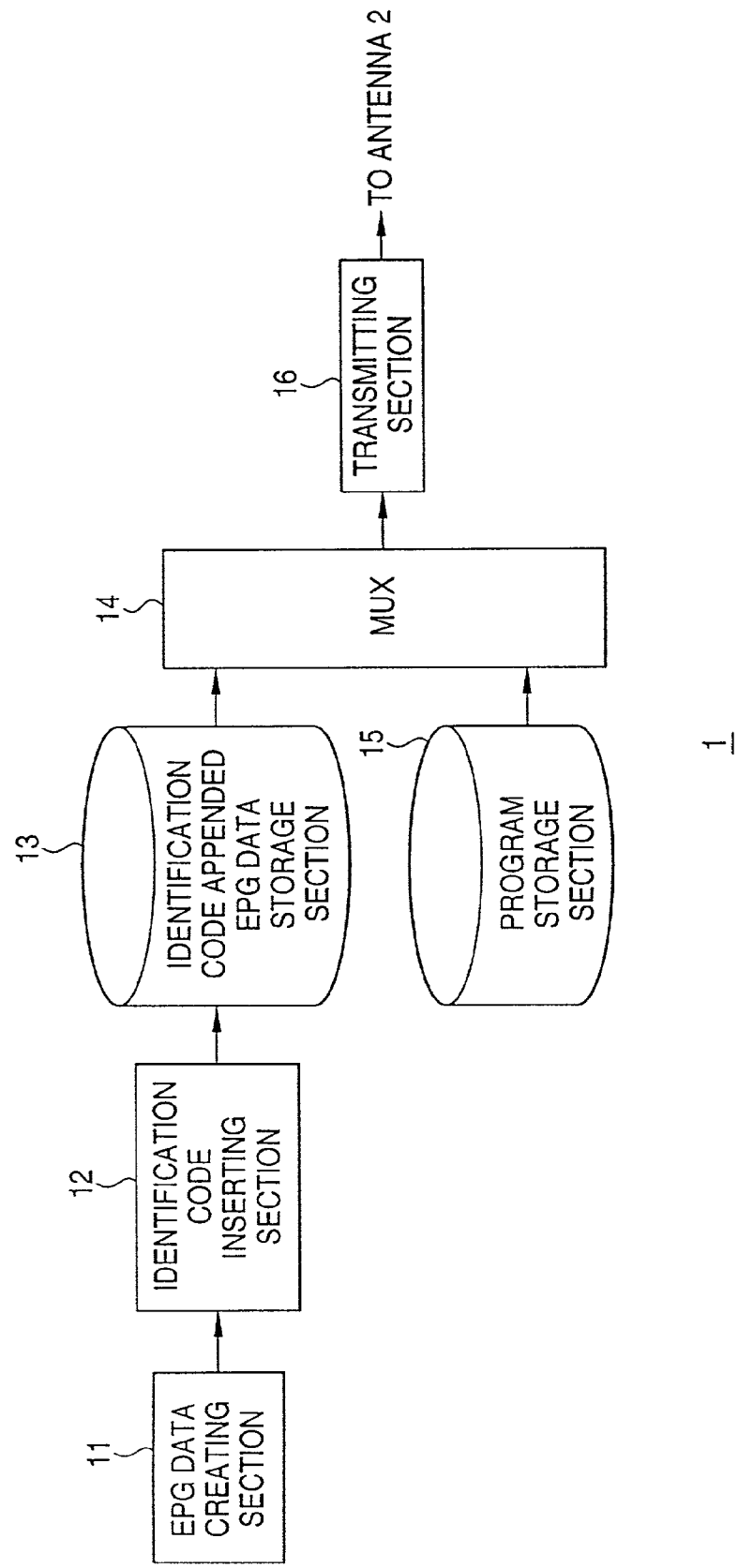

FIG. 6

■ EXAMPLE OF EPG OF SATELLITE DIGITAL BROADCASTING

TAGGED PROGRAM DESCRIPTION DATA
(EXAMPLE OF MOVIE PROGRAM)

PROGRAM TITLE : TWISTER  } TITLE

DESCRIPTION OF PROGRAM (TEXT) :
< 31THE FURY OF TORNADO > RAGING IN THE MIDWEST OF THE
US AND RECKLESS SCIENTISTS WHO STAND AGAINST IT.
TACKLING THIS PICTURE IS THE "JURASSIC PARK"
COMBINATION OF < 18STEVEN SPIELBERG > AS EXECUTIVE
PRODUCER AND < 16MICHAEL CRICHTON > AS SCREENPLAY.
DIRECTED BY < 15YAN DE VONN > WHO HAD DIRECTED
"THE SPEED". < 31A PANIC SPECTACLE > MAKING THE MOST USE
OF THE LATEST < 31CG AND SFX > IS PLAYED.
IMPASSIONED PERFORMANCE OF < 11BILL PAXTON > AND
< 11HELEN HUNT > IS ALSO WORTHY OF SEEING.  FOR
< 43YOUNG COUPLES > TO < 47FAMILIES >.  < 21'96 >
< 22THE US. >, < 24COLOR > / < 25STEREO >, < 23113 MIN. >

} DESCRIPTION TEXT

FIG. 7

| CLASSIFICATION NO. | SPECIFIC CHARACTER PART |
|---|---|
| 1- | NAME OF PERSON |
| 11 | CAST |
| 12 | ATHLETE |
| 13 | MC |
| 14 | CASTER, COMMENTATOR |
| 15 | MOVIE DIRECTOR |
| 16 | SCENARIO WRITER |
| 17 | AUTHOR |
| 18 | OTHERS |
| 2- | PRODUCTION DATA |
| 21 | THE TIMES |
| 22 | COUNTRY, REGION |
| 23 | PROGRAM TIME |
| 24 | PICTURE CHARACTERISTICS |
| 25 | SOUND CHARACTERISTICS |
| 26 | LIVE BROADCASTING |
| 27 | FILMED IN STUDIO |
| 28 | OTHERS |
| 3- | KEYWORD |
| 31 | KEYWORD #1 |
| 32 | KEYWORD #2 |
| 33 | KEYWORD #3 |
| 34 | KEYWORD #4 |
| 35 | KEYWORD #5 |
| 36 | KEYWORD #6 |
| 37 | KEYWORD #7 |
| 38 | KEYWORD #8 |
| 4- | TARGET VIEWER |
| 41 | FOR INFANT |
| 42 | FOR ELEMENTARY AND JUNIOR HIGH-SCHOOL STUDENTS |
| 43 | FOR YOUNG |
| 44 | FOR ELDERLY PERSON |
| 45 | FOR MAN |
| 46 | FOR WOMAN |
| 47 | FOR GENERAL |
| 48 | OTHERS |

FIG. 10

EXAMPLE IN WHICH STYLE OF FONT OF CASTS AND KEYWORDS
ARE CHANGED SO AS TO BE READILY DISCRIMINATED

> THE FURY OF TORNADO RAGING IN THE MIDWEST OF THE US AND
> RECKLESS SCIENTISTS WHO STAND AGAINST IT. TACKLING THIS PICTURE
> IS THE "JURASSIC PARK" COMBINATION OF *STEVEN SPIELBERG* AS
> EXECUTIVE PRODUCER AND *MICHAEL CRICHTON* AS SCREENPLAY.
> DIRECTED BY *YAN DE VONN* WHO HAD DIRECTED "THE SPEED".
> A PANIC SPECTACLE MAKING THE MOST USE OF THE LATEST **CG AND
> SFX** IS PLAYED. IMPASSIONED PERFORMANCE OF *BILL PAXTON
> AND HELEN HUNT* IS ALSO WORTHY OF SEEING. FOR YOUNG COUPLES TO
> FAMILIES. '96, THE US, COLOR/STEREO, 113 MIN.

FIG. 11

EXAMPLE IN WHICH CASTS, KEYWORDS #1 AND #2 AND PRODUCTION
DATA ARE HIGHLIGHTED BY COLORS PER ATTRIBUTE

> THE FURY OF TORNADO RAGING IN THE MIDWEST OF THE US AND
> RECKLESS SCIENTISTS WHO STAND AGAINST IT. TACKLING THIS PICTURE
> IS THE "JURASSIC PARK" COMBINATION OF *STEVEN SPIELBERG* AS
> EXECUTIVE PRODUCER AND *MICHAEL CRICHTON* AS SCREENPLAY.
> DIRECTED BY *YAN DE VONN* WHO HAD DIRECTED "THE SPEED".
> A PANIC SPECTACLE MAKING THE MOST USE OF THE LATEST **CG AND
> SFX** IS PLAYED. IMPASSIONED PERFORMANCE OF *BILL PAXTON
> AND HELEN HUNT* IS ALSO WORTHY OF SEEING. FOR YOUNG COUPLES TO
> FAMILIES. '96, THE US, COLOR/STEREO, 113 MIN.

FIG. 12

EXAMPLE IN WHICH KEYWORDS ARE TAKEN OUT AND
HIGHLIGHTED BY LAYING OUT AS SUBTITLE

---

*A PANIC SPECTACLE, THE FURY OF TORNADO!*

THE FURY OF TORNADO RAGING IN THE MIDWEST OF THE US AND
RECKLESS SCIENTISTS WHO STAND AGAINST IT. TACKLING THIS PICTURE
IS THE "JURASSIC PARK" COMBINATION OF *STEVEN SPIELBERG* AS
EXECUTIVE PRODUCER AND *MICHAEL CRICHTON* AS SCREENPLAY.
DIRECTED BY *YAN DE VONN* WHO HAD DIRECTED "THE SPEED".
A PANIC SPECTACLE MAKING THE MOST USE OF THE LATEST **CG AND
SFX** IS PLAYED. IMPASSIONED PERFORMANCE OF *BILL PAXTON
AND HELEN HUNT* IS ALSO WORTHY OF SEEING. FOR YOUNG COUPLES TO
FAMILIES. '96, THE US., COLOR/STEREO, 113 MIN.

KEYWORDS ARE LEGIBLY LAID OUT PER ATTRIBUTE,
TITLE IS PUT TOGETHER WITH SUBTITLE AND EXPLANATION
IS LAID OUT IN THE OTHER PAGE

```
TWISTER,
A PANIC SPECTACLE, THE FURY OF TORNADO!

PRODUCED BY:      STEVEN SPIELBERG
SCREENPLAY BY:    MICHAEL CRICHTON
DIRECTED BY:      YAN DE VONN
CAST:             BILL PAXTON
                  HELEN HUNT
DATA:             '96, THE US., COLOR/STEREO, 113 MIN.
OBJECT:           FOR YOUNG COUPLES TO FAMILIES
```

*FIG. 13A*

```
EXPLANATION:
THE FURY OF TORNADO RAGING IN THE MIDWEST OF
THE US AND RECKLESS SCIENTISTS WHO STAND
AGAINST IT. TACKLING THIS PICTURE IS THE
"JURASSIC PARK" COMBINATION OF STEVEN SPIELBERG
AS EXECUTIVE PRODUCER AND MICHAEL CRICHTON AS
SCREENPLAY. DIRECTED BY YAN DE VONN WHO HAD
DIRECTED "THE SPEED". A PANIC SPECTACLE MAKING
THE MOST USE OF THE LATEST CG AND SFX IS PLAYED.
IMPASSIONED PERFORMANCE OF BILL PAXTON AND
HELEN HUNT IS ALSO WORTHY OF SEEING.
FOR YOUNG COUPLES TO FAMILIES.
```

EXAMPLE OF RETRIEVING A PROGRAM BY CAST

CAST

KEBIN COSTNER
JOHN TRAVOLTA
SCOTT BUCKLER
BILL BUCKSTON
◆ HELEN HUNT
MICHAEL DOUGLAS
ROBIN WILLIAMS

CURSOR

APPEARING IN PROGRAM:

123 ch   TWISTER   OCT. 24
                   19:00 - 21:00

INFORMATION PROCESSOR, INFORMATION PROCESSING METHOD AS WELL AS BROADCASTING SYSTEM AND BROADCASTING METHOD

BACKGROUND OF THE INVENTION

1. Field of the Invention

The present invention relates to an information processor and an information processing method as well as a broadcasting system and a broadcasting method and more particularly to an information processor and an information processing method as well as a broadcasting system and a broadcasting method which allow to effectively utilize guide information such as EPG (electronic program guide) for guiding broadcasting programs.

2. Description of the Related Art

The multi-channelization of broadcasting is in progress in the US in the field of cable television (CATV) and Digital Satellite System (DSS) (Trade Mark of Hughes Communications Inc.) through the application of the high efficient coding technology such as the MPEG (moving picture experts group) code lately. Along with the multi-channelization, a number of channels has increased up to 150 to 200, so that it is not easy to find a desired program out of them. That is, when there are a large number of channels as described above, leaving a case when there are a few number of channels, an user cannot but feel cumbersome when the user finds that a selected channel is not desired one after actually confirming its program and is obliged to select another channel.

Then, EPG (guide information) for giving a guide on programs and the like are broadcasted today so that the user can recognize the contents of a program and select one readily.

It is noted that the multi-channelization is in progress also in Japan lately owing to the relaxation of regulations and the like. That is, various digital broadcasting services have come to be started.

By the way, data (EPG data) composing the EPG has been composed of the title of a program, its genre, broadcasting starting and ending times and a text (character string) explaining its contents (hereinafter referred to as a description text as necessary) and has been transmitted in a format that allows to discriminate them.

Accordingly, it has been possible to display a list of titles of programs of a certain genre together with their broadcasting starting and ending times and to display the description text of a program when the user selects the title of the program on the receiver side.

By the way, information on the summary of the story of a program, the cast, a viewing age group, a scenario writer, a director and others is described in the description text as shown in FIG. 1 for example. However, the description text is displayed uniformly, so to speak, on the receiver side in general regardless of the contents thereof. That is, when the description text composing the EPG data is what is shown in FIG. 1 for example, the description text is displayed as shown in FIG. 2 on the receiver side. As it is apparent from FIG. 2, it is not easy to understand the contents, what is described where, at first sight in the description text uniformly displayed, so that when the user wants to know the director for example, the user has to read the description text orderly from the top line and cannot but feel cumbersome. Further, even if the broadcasting station side describes that the movie makes the most use of the latest CG and SFX in the description text to appeal that to the user, it has been difficult to let the user to notice on the display part of "the latest CG and SFX" and to appeal that by the description text displayed uniformly as shown in FIG. 2.

Meanwhile, there is also a case when the user wants to retrieve a program in which his/her favorite player appears. In such a case, however, the user must judge whether or not the favorite player appears in the program by displaying and reading the description text of each program as shown in FIG. 2. Accordingly, it has been also cumbersome.

Then, it is conceivable to establish a method of searching the program in which the favorite player appears by letting the user to input the name of the favorite player and by retrieving a character string coincident with that name from the description text.

However, it requires the user to input the name of the favorite player in such a case and the user who is unaccustomed to such character inputting operation cannot but feel cumbersome. Further, the retrieval of the character string coincident with the name of the player must be performed on the whole description text in such a case. Accordingly, when there exists EPG data of a large number of programs, it takes an enormous amount of time for the processing because the retrieval has to be performed on the whole description texts of all of the programs.

SUMMARY OF THE INVENTION

It is an object of the present invention to utilize the EPG data effectively and thereby to provide various services to users.

An inventive information processor comprises inserting means for inserting identification codes, for identifying predetermined parts of guide information for giving a guide on programs, in the guide information. An inventive information processing method comprises a step of inserting the identification codes, for identifying the predetermined parts of the guide information, in the guide information. Accordingly, the predetermined parts may be sampled readily from the guide information.

An inventive information processor comprises sampling means for sampling the predetermined parts out of the guide information based on the identification codes for identifying the predetermined parts, which have been inserted in the guide information for giving a guide on programs; and processing means for implementing predetermined processes based on the sampling result of the sampling means. An inventive information processing method comprises steps of sampling the predetermined parts out of the guide information based on the identification codes for identifying the predetermined parts, which are inserted in the guide information for giving a guide on the programs; and implementing predetermined processes based on the sampling result of the sampling means. Accordingly, the display and the like of the predetermined parts may be controlled for example.

An inventive broadcasting system comprises a transmitter having inserting means for inserting identification codes, for identifying predetermined parts of guide information, in the guide information; and a receiver having sampling means for sampling the predetermined parts out of the guide information based on the identification codes inserted in the guide information; and processing means for implementing predetermined processes based on the sampling result of the sampling means. An inventive broadcasting method comprises steps of inserting identification codes, for identifying predetermined parts of guide information, in the guide information in the transmitter; and sampling the predetermined parts out of the guide information based on the identification codes inserted in the guide information and implementing predetermined processes based on the sampling result thereof in the receiver. Accordingly, the predetermined parts may be readily sampled out of the guide information and the display of the predetermined parts may be controlled.

The specific nature of the invention, as well as other objects, uses and advantages thereof, will clearly appear from the following description and from the accompanying drawings in which like numerals refer to like parts.

BRIEF DESCRIPTION OF DRAWINGS

FIG. 1 shows a conventional EPG data;

FIG. 2 shows an exemplary display of the conventional EPG data;

FIG. 5 is a block diagram showing the exemplary structure of the transmitter in FIG. 3;

FIG. 6 shows a description text in which identification codes are inserted;

FIG. 7 is a chart for explaining classification Nos.;

FIG. 10 shows an exemplary EPG displayed by the receiver;

FIG. 11 shows another exemplary EPG displayed by the receiver;

FIG. 12 shows a still other exemplary EPG displayed by the receiver;

FIGS. 13A and 13B show different exemplary EPGs displayed by the receiver;

FIG. 14 shows a screen when a program is to be retrieved from the cast; and

DESCRIPTION OF THE PREFERRED EMBODIMENT

A preferred embodiment of the present invention will be explained below with reference to the drawings.

Figure 3:
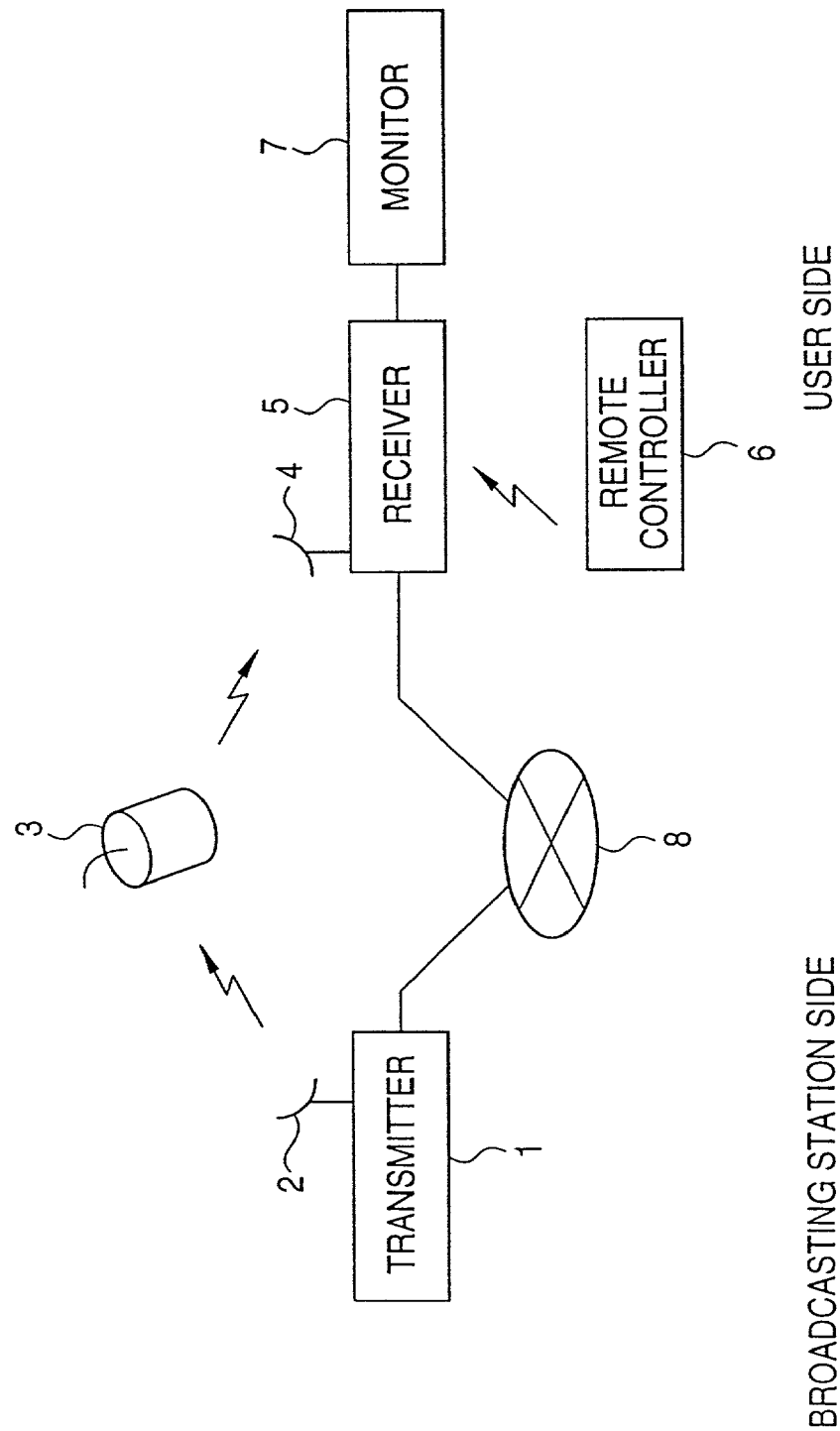
FIG. 3 is a block diagram showing the exemplary structure of one embodiment of a broadcasting system to which the present invention is applied.

FIG. 3 is a block diagram showing the exemplary structure of one embodiment of a broadcasting system to which the present invention is applied (the system refers to an object in which a plurality of devices are logically congregated and it does not matter whether or not each component is contained in one case).

The broadcasting station generates information on the title of a program (broadcasting program), its genre, broadcasting starting time and ending times and a description text explaining the contents thereof as EPG data (guide information) for giving a guide on the program in a transmitter 1. Further, predetermined character parts (hereinafter referred to as a specific character part as necessary) composing the description text are selected and identification codes (tags) for identifying the specific character parts are inserted in the description text in the transmitter 1.

Figure 4A:
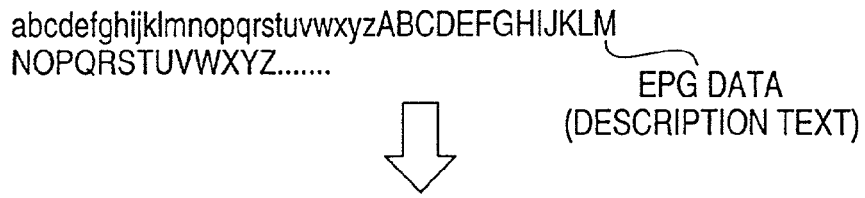
FIGS. 4A and 4B are drawings for explaining processes performed by a transmitter and a receiver in FIG. 3.

That is, assume here that the description text is "abcdefghijklmnopqrstuvwxyz ABCDEFGHIJKLMNOPQRSTU-VWXYZ . . . " and "xyz" and "PQR" among them are set as the specific character parts. In this case, the identification codes for identifying the specific character parts "xyz" and "PQR" are inserted as shown in FIG. 4A.

Here, the identification code is composed of two identifiers for identifying the head and ending positions of the specific character part and a classification No. (classification information) for classifying the specific character part. That is, in the embodiment shown in FIG. 4A, "<" and ">" are used as the identifiers for identifying the head and ending positions of the specific character part and are inserted right before and right after the specific character part, respectively. Further, in the embodiment in FIG. 4A, a numeral of one-digit is used as the classification No. for classifying the specific character part and is inserted right after the identifier "<" for identifying the head position of the specific character part. It is noted that the classification No. is decided in advance in correspondence to the contents of the specific character part. That is, they are decided in advance such that the classification No. is "1" when the specific character part shows a director of a program and is "2" when the specific character part shows the cast of the program. In the embodiment of FIG. 4A, "1" and "2" are inserted as the classification Nos. of the specific character parts "xyz" and "PQR", respectively.

Returning now to FIG. 3, the EPG data in which the identification codes as described above is multiplexed with the program in the transmitter 1 and is transmitted from an antenna (parabola antenna) 2 as radio waves.

A satellite 3 receives the radio waves and transmits them after implementing necessary processing steps such as amplification by a transponder not shown. An antenna (parabola antenna) 4 of the user (viewer) side receives the radio waves from the satellite 3 and supplies corresponding received signals (transmission data) to a receiver 5.

A program in a channel corresponding to that selected by the user through the manipulation of a remote controller (remote commander) 6 is selected and separated from the signals received from the antenna 4 and is supplied to a monitor 7. The monitor 7 displays the program (picture) from the receiver 5 (sound is outputted from a speaker not shown).

In the receiver 5, the EPG data is separated from the signals received from the antenna 4 and the specific character parts are sampled from the EPG data (the description text here) based on the identification codes inserted there. That is, when the description text composing the EPG data is "abcdefghijklmnopqrstuvw<1xyz>ABCDEFGHIJKLMNO<2PQR>STUVWXYZ . . . " shown in FIG. 4A, "xyz" and "PQR" are sampled as the specific character parts as shown in FIG. 4B in the receiver 5.

The sampled specific character parts are stored in correspondence to the EPG data in which the specific character parts are described and then various processes are implemented based on the stored specific character parts in the receiver 5.

Figure 4B:
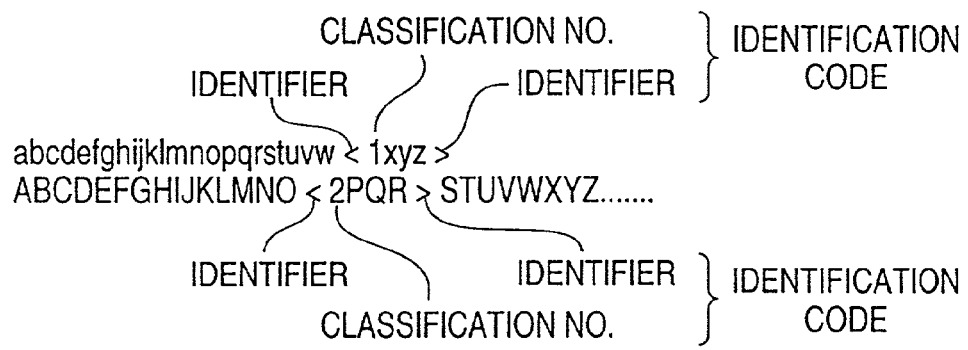

That is, when the user manipulates the remote controller 6 so as to display the above-mentioned description text for example, the specific character parts "xyz" and "PQR" in the description text are displayed in a color, a style or a point No. (size) different from those of the other parts as shown in FIG. 4B. Accordingly, the user can notice on the specific character parts "xyz" and "PQR" instantly in this case. That is, it allows the user to recognize the cast of the program when the specific character parts are names of the cast for example. Conversely speaking, it becomes possible for the broadcasting station to appeal the cast of the program effectively by setting the names of the cast within the description text as the specific character parts.

It is noted that while the identification code is composed of the identifiers and the classification No. as described above, different classification Nos. are affixed to the specific character parts "xyz" and "PQR" in the embodiment of FIG. 4A. Accordingly, it is possible to discriminate the specific character part "xyz" from "PQR" and as a result, it is possible to display them in different colors, styles and point Nos. also in the relation between the specific character parts "xyz" and "PQR".

When the user manipulates the remote controller 6 so as to display the specific character parts, the specific character parts stored in the receiver 5 are displayed. When the user manipulates the remote controller 6 further so as to select either one of the displayed specific character parts, EPG data corresponding to the selected specific character part is retrieved and is displayed. Accordingly, when the specific character part is the name of the cast for example, a list of the cast is displayed in the above-mentioned case and when the user selects a player from the list, EPG of the program in which the player appears is displayed. That is, the user can find the program in which the desired player appears readily in this case.

It is noted that there is also a case when a PPV (pay per view) program is sent from the transmitter 1. When the user has viewed the PPV program, an accounting process is performed in the receiver 5. The accounting information is transmitted to the transmitter 1 via a public telecommunication network 8 and the like.

FIG. 5 is a block diagram showing the exemplary structure of the transmitter 1 in FIG. 3.

An EPG data creating section 11 and an identification code inserting section 12 are realized by executing a predetermined application program in a personal computer or the like for example. The EPG data creating section 11 creates EPG data about programs stored (recorded) in a program storage section 15 formed by a hard-disk or another recording medium. That is, when an operator inputs the title of each program, its genre, broadcasting starting time (including date as necessary), broadcasting ending time and a description text for explaining the contents thereof stored in the program storage section 15, the EPG data creating section 11 creates the EPG data per each program in a predetermined format. The EPG data is supplied to the identification code inserting section 12.

The identification code inserting section 12 inserts the identification codes to the description text composing the EPG data from the EPG data creating section 11. That is, the identifiers (<, >) are inserted before and after the specific character part composing the description text and the classification No. is inserted right after the identifier (<) through the operation performed by the operator as explained in FIG. 4A. Thereby, the identification code inserting section 12 creates the EPG data having the description text in which the identification codes are inserted as shown in FIG. 6 (hereinafter referred to as identification coded EPG data as necessary).

Here, the identifier must be a code not used within the description text. "<" and ">" of one byte of the ASCII code are adopted here as the identifiers as described above, so that it is arranged so as not use "<" and ">" within the description text.

Further, 2 bytes of the ASCII codes are used for the classification No. as shown in FIG. 6. Further, Nos. corresponding to the contents of specific character parts are assigned as the classification Nos. beforehand as shown in FIG. 7. That is, when the specific character part represents a name of a person for example, "1-" is used for the specific character part as the classification No. thereof. When the specific character part represents the cast of a program, "11" is used as the classification No. thereof.

The classification Nos. are arranged in the hierarchical structure. That is, while two digits of numerals are used for each classification No. as shown in FIG. 7, some of the classification Nos. have a numeral at the first digit (the units digit) thereof and the others are hyphenated. Among the classification Nos. having the same second digit (the tens digit), the classification Nos. whose first digit is hyphenated are high-order classification Nos. and the classification Nos. whose first digit is a numeral are low-order classification Nos. In concrete, among the classification Nos. whose second digit is 1, one whose first digit is hyphenated is "name of person" as described above and is the high-order concept (high-order layer) as compared to those classification Nos. whose first digit is a numeral, e.g., "the cast" and "athletes" (in other words, those classification Nos. of "the cast" and "athletes" whose first digit is numeral are the low-order concept (low-order layer) as compared to the classification No. of "name of person" whose first digit is hyphenated.

Accordingly, the specific character parts "The fury of Tornado", "CG and SFX" and "Panic Spectacle" to which the classification No. "31" is affixed in FIG. 6 all represent Keyword #1 (character parts which turn out to be keywords in the description text and which belong to a first category). Further, the specific character part "Spielberg" to which the classification No. "18" is affixed represents one which does not belong to the classification Nos. "11" through "17" in the category of name of person. Further, the specific character part "Michael Crichton" to which the classification No. "16" is affixed represents an author and the specific character part "Yan De Vonn" to which the classification No. "11" is affixed represents a movie director. The specific character parts "Bill Paxton" and "Helen Hunt" to which the classification No. "11" is affixed represent the cast. The specific character part "young couple" to which the classification No. "43" is affixed represents that the program is suited for young people and the specific character part "families" to which the classification No. "47" is affixed represents that the program is suited for general. Further, the specific character parts "'96", "the US", "color", "stereo" and "113 min." to which the classification Nos. "21", "22", "24", "25" and "23" are affixed represent the period when the program (the movie here) was produced, the country (or region) where the movie was produced, the pictorial characteristics (whether it is a color picture or a monochrome picture for example), the sound characteristics (whether it is stereo sound or monoral sound for example), the broadcasting time of the program and the like, respectively.

Returning now to FIG. 5, the EPG data (identification coded EPG data) in which the identification codes are inserted to the description text as described above is created in the identification code inserting section 12. It is noted that although the EPG data has been inputted and the identification codes have been inserted to the EPG data in the case described above, it is also possible to input the identification codes in the same time in inputting the EPG data.

The identification coded EPG data is supplied to and stored in the identification coded EPG data storage section 13. The identification coded EPG data stored in the identification coded EPG data storage section 13 and the program stored in the program storage section 15 are read and are multiplexed in a MUX (multiplexer) 14. Thereby, they are transformed into MPEG transport streams for example and are outputted to a transmitting section 16. Then, after implementing necessary processing steps such as scrambling, error correction, modulation and others on the signal from the MUX 14, the transmitting section 16 outputs the signal to the antenna 2.

It is noted that programs (pictures and sound) are stored in the program storage section 15 after being encoded in the MPEG format for example.

Figure 8:
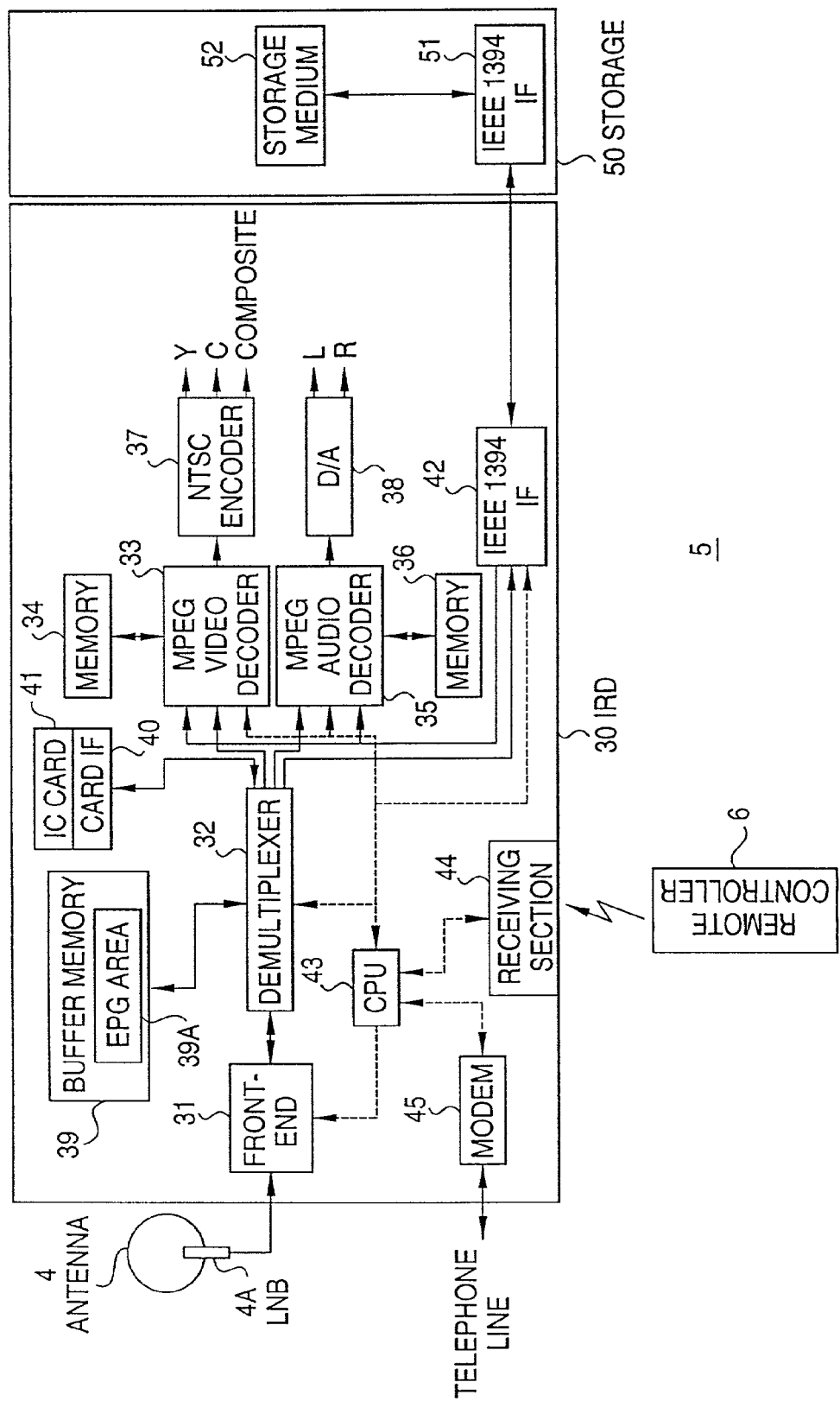
FIG. 8 is a block diagram showing the exemplary structure of the hardware of the receiver in FIG. 3.

FIG. 8 is a block diagram showing the exemplary structure of the hardware of the receiver 5 in FIG. 3. The receiver 5 comprises, roughly speaking, an IRD (integrated receive and decoder) 30 and a storage 50.

The antenna 4 has an LNB (low noise block downconverter) 4A to down-convert the signal from the satellite 3 into a signal of a predetermined frequency to supply to the IRD 30. The signal from the antenna 4 (LNB 4A) is supplied to a front-end 31 composing the IRD 30 and is outputted from there after undergoing necessary processing steps such as decoding, error correction and others.

For instance, necessary keys for deciphering (de-scrambling) cryptograph are stored together with a decipherment program in an IC (integrated circuit) card 41 comprising a CPU (central processing unit), an ROM (read only memory), an RAM (random access memory) and others. Because the broadcasting station (transmitter 1) implements a scrambling process on a program, the de-scrambling process is required in order to see the program. Then, the keys stored in the IC card 41 are read via a card interface (IF) 40 and are supplied to a demultiplexer 32. Utilizing the keys, the demultiplexer 32 de-scrambles the scrambled program.

It is noted that the de-scrambling program, the keys required for that, accounting information and others are stored in the IC card 41.

Receiving the signal (MPEG transport stream here) outputted from the front-end 31, the demultiplexer 32 stores it in a buffer memory (composed of an SRAM (static random access memory) for example) 39 once. Then, the demultiplexer 32 reads the signal as necessary to de-scramble it. Then, when the de-scrambled result is EPG data (the identification coded EPG data here), the demultiplexer 32 stores it in an EPG area 39A which is a partial area of the buffer memory 39. When the de-scrambled result is an ordinary program, the demultiplexer 32 supplies picture data and sound data composing the program to an MPEG video decoder 33 and an MPEG audio decoder 35, respectively.

The MPEG video decoder 33 stores the inputted picture data (digital picture data) to a memory 34 composed of a DRAM (dynamic random access memory) as necessary to execute the MPEG decoding process. The decoded picture is supplied to an NTSC (National Television System Committee) encoder 37 to be transformed into a luminance signal (Y), a chromatic signal (C) and a composite signal (V) in the NTSC form. These signals are supplied to the monitor 7 to be displayed.

It is noted that the MPEG 2-Transport Stream is explained in "The Latest MPEG Text Book" published by ASCII Co., Ltd. on Aug. 1, 1994, pp. 231 through 253.

The MPEG audio decoder 35 stores the digital audio signal supplied from the demultiplexer 32 to a memory 36 composed of a DRAM for example as necessary to execute the MPEG decoding process. The decoded audio signal is converted from digital to analog by a D/A (digital/analog) converter 38 and is outputted via a speaker not shown.

It is noted that when the de-scrambled result is the program, the demultiplexer 32 supplies the de-scrambled result also to an IEEE 1394 interface (IF) 42 as necessary beside the MPEG video decoder 33 and the MPEG audio decoder 35. Receiving the program from the demultiplexer 32, the IEEE 1394 interface 42 supplies it to the storage 50 to store temporarily.

The CPU 43 controls the front-end 31, the demultiplexer 32, the MPEG video decoder 33, the MPEG audio decoder 35, the IEEE 1394 interface 42 and a modem 45.

That is, when a predetermined channel is to be selected for example, the CPU 43 controls the front-end 31. Corresponding to this control, the front-end 31 selects and outputs the signal (packet) of the predetermined channel. Thereby, the monitor 7 displays a program broadcasted in the predetermined channel.

Further, when predetermined OSD (on-screen display) data is to be generated for example, the CPU 43 controls the MPEG video decoder 33. Corresponding to this control, the MPEG video decoder 33 generates and outputs the predetermined OSD data. Thereby, the monitor 7 displays predetermined characters and graphics, e.g., a cursor, the channel currently selected by the receiver 5, a bar whose length changes corresponding to sound volume and the like, as necessary.

The CPU 43 also controls the demultiplexer 32 when EPG data (the identification coded EPG data here) is required for example. Corresponding to this control, the demultiplexer 32 reads the EPG data from the EPG area 39A of the buffer memory 39 and supplies it to the NTSC encoder 37 via the MPEG video decoder 33. Thereby, the monitor 7 displays the EPG in the text form.

The CPU 43 controls the IEEE 1394 interface 42 when information stored in the storage 50 is necessary. Corresponding to this control, the IEEE 1394 interface 42 reads the information (the program here) from the storage 50 and supplies it to the MPEG video decoder 33 and the MPEG audio decoder 35. Thereby, the monitor 7 displays the program (picture) filmed in advance (the sound is outputted from the speaker not shown).

The CPU 43 controls the demultiplexer 32 and the modem 45 in transmitting accounting information for example. Corresponding to this control, the demultiplexer 32 reads the accounting information from the IC card 41 and supplies it to the modem 45 via the CPU 43. Meanwhile, corresponding to the control of the CPU 43, the modem 45 also establishes a link between the transmitter 1 and transmits the accounting information via the public telecommunication network 8. Based on the accounting information, the transmitter 1 performs the accounting process.

The CPU 43 is also arranged so as to perform various processes corresponding to a signal from a receiving section 44. That is, when the user manipulates the remote controller 6, infrared rays corresponding to that manipulation are outputted. The receiving section 44 receives and transforms the infrared rays into electrical signals through photo-electric conversion. Corresponding to the electrical signals, the CPU 43 performs the various processes, e.g., processes of selecting a channel, displaying EPG as described later and the like, corresponding to this electrical signal.

The storage 50 comprises an IEEE 1394 interface 51 and a storage medium 52 composed of a hard-disk for example. The IEEE 1394 interface 51 exchanges programs by communicating with the IEEE 1394 interface 42 composing the IRD 30 under the standard of the IEEE 1394. The storage medium 52 stores (records) programs received via the IEEE 1394 interface 51.

Figure 9:
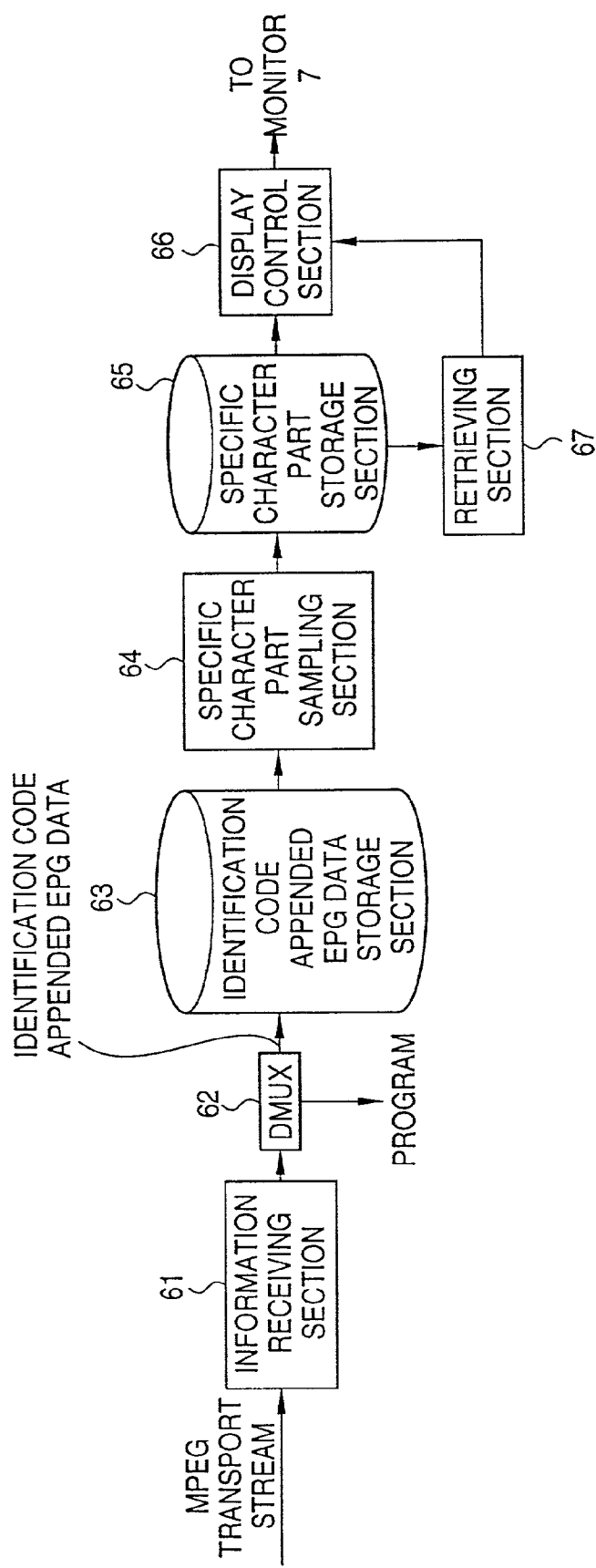
FIG. 9 is a block diagram showing the functional exemplary structure of the receiver in FIG. 3.

FIG. 9 is a block diagram showing the functional exemplary structure of the receiver 5. It is noted that in FIG. 9, an information receiving section 61 corresponds to the front-end 31 in FIG. 8, a DMUX 62 corresponds to the demultiplexer 32 in FIG. 8, an identification coded EPG data storage section 63 and a specific character part storage section 65 correspond to the buffer memory 39 in FIG. 8 and a specific character part sampling section 64, a display control section 66 and a retrieving section 67 correspond to the CPU 43 in FIG. 8, respectively.

The information receiving section 61 receives the MPEG transport stream transmitted from the transmitter 1, selects a packet of a predetermined channel and supplies it to the DMUX 62. The DMUX 62 separates a program or identification coded EPG data from the output of the information receiving section 61. The program is provided to the user (or recorded in the storage 50) after being MPEG-decoded as explained in FIG. 8.

Meanwhile, the identification coded EPG data is supplied to and stored in the identification coded EPG data storage section 63. Then, the specific character part sampling section 64 reads the identification coded EPG data stored in the identification coded EPG data storage section 63 and samples specific character parts by detecting the identification codes inserted therein. The specific character part sampling section 64 also lists the sampled specific character parts in correspondence to specific information specifying the description text (EPG data) from which the specific character parts have been sampled, the positions within the description text where the specific character parts are located and the classification Nos. affixed to the specific character parts (this list will be referred to as a specific character part list hereinafter as necessary) and supplies to and stores them in the specific character part storage section 65. The specific character part sampling section 64 also deletes the identification codes inserted in the EPG data from which the specific character part list has been created to supply to and to store in the specific character part storage section 65.

Then, when the user manipulates the remote controller 6 so as to display the description text of the EPG data of a predetermined program for example, the display control section 66 reads the corresponding description text from the specific character part storage section 65 and supplies it to the monitor 7 to display. At this time, the display control section 66 performs the following display control based on the specific character part list stored in the specific character part storage section 65 for example.

That is, the display control section 66 retrieves the specific character part list created from the description text to be displayed (hereinafter referred to as a description text to be displayed as necessary) based on the above-mentioned specific information and controls and changes the font, for example, of those specific character parts which are registered in the specific character part list and to which the predetermined classification Nos. are affixed within the description text to be displayed to a font different from the default font. It is noted that the position of the specific character parts within the description text to be displayed may be recognized by making reference to the specific character part list.

Thereby, the description text is displayed on the monitor 7 in the manner as shown in FIG. 10 for example. That is, FIG. 10 shows an exemplary display of the description text in which the identification codes are inserted as shown in FIG. 6 and displayed by the receiver 5.

Here, the default font is the standard Mincho typeface for example. Then, the font of the specific character parts to which the classification No. "31" is affixed is controlled to be gothic boldface and the font of the specific character parts to which the classification No. "1-" (the hyphen "-" means a wild card here. Accordingly, "1-" represents all of those having the classification No. whose second digit is 1 ("11" through "18" in the embodiment in FIG. 7)) is affixed is controlled to be Italic font (oblique typeface) in which the Mincho typeface is inclined slightly to the right, respectively, by the display control section 66.

Thereby, the specific character parts to which the classification No. "31" is affixed, i.e., "The fury of tornado", "CG and SFX" and "panic spectacle", are displayed in the gothic boldface, the specific character parts to which the classification No. "1-" is affixed, i.e., "Spielberg", "Michael Crichton", "Yan De Vonn", "Bill Paxton" and "Helen Hunt", are displayed in the Italic Mincho typeface and the remaining parts are displayed in the standard Mincho typeface, the default font, respectively as shown in FIG. 10.

In this case, the user can instantly notice on the keywords of the program, i.e., "The fury of tornado", "CG and SFX" and "panic spectacle" whose font is different and as a result, the user can recognize the outline of the program without reading the whole description text. The user can also instantly notice on the names of persons, i.e., "Spielberg", "Michael Crichton", "Yan De Vonn", "Bill Paxton" and "Helen Hunt" whose font is different and as a result, the user can find the cast and the director of the program at first sight.

Although the font is controlled in the case of FIG. 10, it is also possible to control the display color for example beside that. That is, when the default display color is black, the display color of the specific character parts to which the classification No. "31" is affixed may be controlled to be red, the display color of the specific character parts to which the classification No. "1-" is affixed may be controlled to be blue and the display color of the specific character parts to which the classification No. "2-" is affixed may be controlled to be purple, respectively, for example by the display control section 66.

In this case, as shown in FIG. 11, the specific character parts to which the classification No. "31" is affixed, i.e., "The fury of tornado", "CG and SFX" and "panic spectacle", are displayed in red color (indicated by solid underlines in the figure), the specific character parts to which the classification No. "1-" is affixed, i.e., "Spielberg", "Michael Crichton", "Yan De Vonn", "Bill Paxton" and "Helen Hunt", are displayed in blue color (indicated by dotted underlines in the figure), the specific character parts to which the classification No. "2-" is affixed, i.e., "'96", "the US", "color", "stereo" and "113 min.", are displayed in purple color (indicated by a wavy underline in the figure) and the remaining parts are displayed in black color which is the default display color.

Accordingly, the user can instantly notice on the keywords and the name of persons of the program in the same manner with the case of FIG. 10. Further, in case of FIG. 11, the user can also instantly notice on the information related to the production of the program of "'96", "the US", "color", "stereo" and "113 min."

It is also possible to control the layout in displaying the description text by the display control section 66. FIG. 12 shows an exemplary display when the layout is controlled so as to add the specific character parts "Panic Spectacle" and "The Fury of Tornado" in the description text as the headline. It is noted that "Panic Spectacle" and "The Fury of Tornado" disposed as the headline may be displayed in another color, e.g., in red, beside black which is the default display color.

It is also possible to create a screen for giving an outline of the contents of the description text in which the predetermined specific character part is disposed (hereinafter referred to as an outline screen as necessary) anew and to provide it to the user together with the screen in which the description text is displayed by the display control section 66 as an application in controlling the layout.

FIG. 13A shows an exemplary outline screen created from the specific character parts contained in the description text in FIG. 6. When the user manipulates the remote controller 6 so as to display the next page while the outline screen is being displayed, the screen of the description text shown in FIG. 13B is displayed. When the user manipulates the remote controller 6 so as to display the previous page while the screen of the description text is being displayed, the outline screen shown in FIG. 13A is displayed. It is noted that although the title of the program, "Twister", is displayed at the upper part of the outline screen in FIG. 13A, one stored in the specific character part storage section 65 as the EPG data is utilized here because it is not contained in the description text (i.e., it is not the specific character part).

When the user wants to retrieve a program in which the favorite player appears, the user manipulates the remote controller 6 so as to display the list of the cast. In this case, the retrieving section 67 of FIG. 9 retrieves the specific character parts to which the classification No. indicative of the cast ("11" as shown in FIG. 7 in the present embodiment) is affixed by making reference to the specific character part list stored in the specific character part storage section 65. The specific character parts, i.e., the names of the cast, are then supplied to the display control section 66. The display control section 66 arranges the names of the cast sent from the retrieving section 67 in the form of a list and supplies it to the monitor 7 to display. That is, thereby, the monitor 7 displays the list of the names of the cast as shown in FIG. 14 for example.

At this time, a cursor is also displayed on the monitor 7. When the cursor is moved to the position of the name of the desired player, the retrieving section 67 retrieves the EPG data containing the description text in which the name of the player is described by making reference to the specific character part list stored in the specific character part storage section 65. The retrieving section 67 also recognizes the name of the corresponding program, its broadcasting channel, broadcasting starting and ending times and others by making reference to the EPG data. Then, the retrieving section 67 supplies them to the monitor 7 to display via the display control section 66. Thereby, the monitor 7 displays the name of the program in which the player pointed by the cursor appears, its broadcasting channel, broadcasting date and others as shown in FIG. 14.

That is, in the embodiment in FIG. 14, while the cursor is positioned where the name of the player "Helen Hunt" is displayed, the program name "Twister", the channel "123 ch" and the broadcasting date "Oct. 24, 19:00 to 21:00" are displayed at the lower part of the screen as a result of retrieval of the program in which "Helen Hunt" appears.

Figure 15:
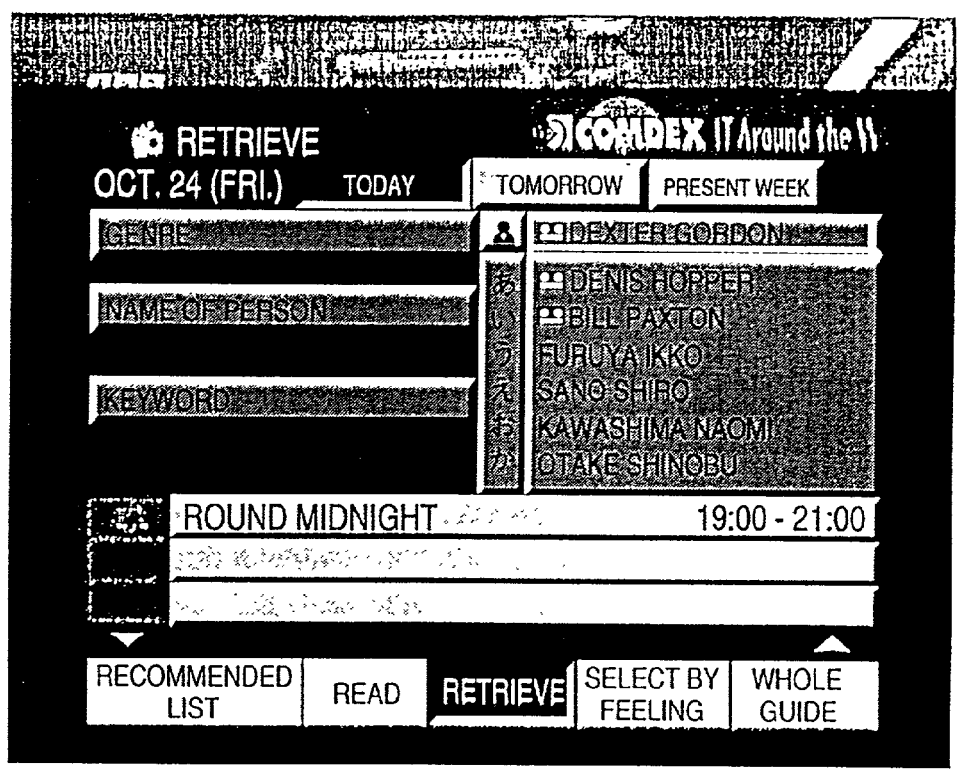
FIG. 15 is representative of a display showing the retrieving screen.

FIG. 15 shows an actual exemplary display screen displayed on the monitor 7 in retrieving as described above (hereinafter referred to as a retrieving screen as necessary).

"Genre" button, "Name of Person" button and "Keyword" button are provided at the upper left part of the retrieving screen. When the user manipulates the "Name of Person" button among them, the specific character parts (names of persons) to which the classification No. indicative of a name of person ("1-" as shown in FIG. 7 in the present embodiment) is affixed are retrieved by the retrieving section 67 and are displayed within a column located at the right side of the "Name of Person" button.

It is noted that although names of seven persons, i.e., "Dexter Gordon", "Denis Hopper", "Bill Paxton", "Furuya Ikko", "Sano Shiro", "Kawashima Naomi" and "Otake Shinobu" are displayed in the embodiment of FIG. 15, names of persons not currently displayed may be displayed, when there are names of persons to be displayed beside them, by manipulating the remote controller 6 so as to scroll the screen.

Programs in which the player of the retrieved name appears are displayed in the order of broadcasting starting time and when the program broadcasting starting time is the same, they are displayed in the order of the Japanese kana syllabary here. It is noted that there is case when a mark of video cassette is put on the left side of the retrieved name of person (the mark is put on the left side of "Dexter Gordon", "Denis Hopper" and "Bill Paxton" in FIG. 15), it indicates that a program in which that person appears is currently on the air. No information is displayed about a program which has been already broadcasted. It is because the EPG data about the program which has been already broadcasted and the specific character part list created based on that are not necessary any more and are deleted from the specific character part storage section 65.

In the embodiment shown in FIG. 15, a frame-like cursor is positioned at the part where "Dexter Gordon" is displayed. Then, names of programs in which "Dexter Gordon" appears are retrieved and are displayed at the lower part of the retrieving screen. When the user specifies the part where the program name is displayed for example by manipulating the remote controller 6, the receiver 5 selects the broadcasting station when the program is on the air or displays the corresponding EPG when it is not broadcasted yet.

It is noted that although the above-mentioned embodiment has been arranged so as to display the names of persons and to select either one of the names of persons to retrieve a program in which the selected person appears, it is also possible to arrange so as to retrieve the program by displaying a predetermined keyword or a genre of a program.

Further, because it becomes difficult for the user to find a desired player when all of the names of persons stored in the specific character part storage section 65 are displayed in retrieving a program by displaying the names of persons for example, it is preferable to restrict the names of persons by setting conditions such as the genre of programs, the broadcasting channel, programs broadcasted today or tomorrow or by the names starting with a specific alphabet in the order of the Japanese kana syllabary.

As described above, the arbitrary parts of the text composing the EPG data (the description text here) are set as the specific character parts and the identification codes for identifying those specific character parts are inserted in the EPG data in the transmitter 1, so that it is possible to sample (retrieve) the specific character parts quickly in the receiver 5. That is, when no identification code is inserted, it takes time to retrieve a certain character string from the description text because the retrieval has to be performed on the whole description text. In contrary to that, the specific character parts may be retrieved quickly by inserting the identification codes.

The format of the EPG data needs not be changed because the identification codes are embedded, so to speak, to the description text. That is, while the identification codes are used to identify the specific character parts in the receiver 5 as described above, they give no influence on the format of the EPG data at all because it means that the types of the character codes describing the description text has just increased from the point of view of the transmitter 1.

Although a method of sampling the specific character parts within the description text in advance in the transmitter 1 and of transmitting it separately from the description text is conceivable as a method for sampling the specific character parts quickly, a data amount increases in this case by the amount corresponding to the specific character parts separately transmitted. Further, because the specific character parts are described in the description text, it is redundant to transmit the specific character parts beside those described in the description text. The increase of the data amount may be suppressed and the redundancy may be avoided by inserting the identification codes within the description text as compared to the case of transmitting the specific character parts separately.

Further, because the identification coded EPG data has the classification No. corresponding to the contents of the specific character part, the specific character part may be classified (discriminated) corresponding to the contents thereof based on the classification No. It then allows the specific character part to be visually decorated (by changing the font, display color, layout and the like as described above) in displaying the description text and the description text may be displayed with, so to speak, modulation for effect. As a result, the user can recognize the cast of a program for example at first sight. Further, the broadcasting station can appeal the program effectively by setting the character parts which are the keywords for advertising the program as the specific character parts.

It also becomes possible to provide the list of the specific character parts classified in the same category, e.g., the list of the cast and the director of the program, to the user by classifying the specific character parts corresponding to the contents thereof and to provide the EPG data of the program in which the player or the director is involved to the user when the player or the director is selected from the list. Accordingly, the user can retrieve a program from the favorite player or the director, for example. The user can input the favorite player or the director by selecting from the list and needs not to type the name.

While the case when the present invention is applied to the broadcasting system transmitting programs via the satellite line has been explained above, the present invention is applicable in transmitting programs also via the CATV (Cable Television) network, the ground wave and the like.

It is noted that although the program and the EPG data (identification coded EPG data) have been both transmitted via the satellite line in the embodiment described above, they need not to be transmitted always through the same transmitting medium. That is, it is possible to transmit the program through the satellite line and to transmit the EPG data by a telephone line, respectively, for example.

Further, the identification code has been composed of the identifiers and the classification No., i.e., the plurality of types of identification codes have been prepared, so as to insert the identification codes corresponding to the contents of the specific character parts (the identification codes having the classification Nos. corresponding to the contents of the specific character parts) in the embodiment described above, the identification code may be composed of only identifiers. In this case, however, it is difficult to classify the specific character parts in accordance to the contents thereof in the receiver 5. As a result, although it is possible to differentiate the display color of the specific character parts within the description text from that of the other part, it is difficult to differentiate the display color of a certain specific character part from that of the other specific character part.

Further, the identifiers "<" indicative of the head position of the specific character part and ">" indicative of the ending position thereof have been used as the identifiers for identifying the position of the specific character part within the description text and have been inserted right before and right after the specific character part, respectively, in the embodiment described above, the codes used as the identifiers and the way how to insert the identifiers are not limited to those described above as a matter of course. That is, the identifier may be inserted only at the right before or right after the specific character part together with a data length, e.g., a number of characters, of the specific character part. The identifiers may be inserted at arbitrary positions within the description text together with the starting and ending positions of the specific character part within the description text (it may be the data length of the specific character part instead of either one of the starting position and the ending position) so as to parenthesize them. In this case, the starting and ending positions of a plurality of specific character parts may be described between the head identifier and the ending identifier.

Still more, although the specific character parts have been sampled out of the description text in advance in the embodiment described above, it is possible to arrange so as to sample the specific character parts when they are required. In this case, however, it takes time for the processing because the sampling is performed every time when the specific character part is required.

Although the identification codes have been deleted from the description text after sampling the specific character parts out of the description text in the embodiment described above, it is not necessary to delete the identification codes. In this case, however, it is necessary to arrange the display control section 66 so as to neglect the identification codes contained in the description text in displaying the description text.

Although the classification No. has been structured in the hierarchical structure of two layers in the embodiment described above, the classification No. may be structured in the hierarchical structure of three or more layers or may be structured without having the hierarchical structure.

Although the specific character part as a predetermined character string (or a character) in a text has been identified by inserting the identification code in the text in the embodiment described above, it is also possible to insert the identification code in picture data or sound data for example, beside the text data, and to use to identify a predetermined part in the picture data or the sound data.

Although the font, the display color or the layout of the specific character part has been controlled in displaying the description text in the embodiment described above, it is also possible to control the background color or the point No. (size) of the specific character part or to add underlines, blinking or motions. It is also possible to control the display by starting a new line before and after the specific character part and by inserting spaces for example.

Although the control of the display and the retrieval of a program have been implemented based on the specific character part in the embodiment described above, the processes implemented based on the specific character part are not limited to them. That is, the transmitter 1 only inserts the identification codes for identifying the specific character parts and processes to be implemented and services to be provided to the user based on the specific character parts sampled by using the identification codes depend on the structure of the receiver 5 (depends on an application mounted in the receiver 5). In concrete, when a function of storing the specific character parts as the names of persons selected in the retrieving screen shown in FIG. 15 is mounted in the receiver 5 for example, a favorite player of the user and programs in which the player appears can be found from the stored contents. Thereby, it becomes possible to recognize the viewing history and the favorite program genre of the user and to provide programs and other services suited to the liking of the user.

Although the specific character part has been sampled after storing the identification coded EPG data once in the identification coded EPG data storage section 63 in the embodiment described above, the specific character part may be sampled also on real-time. That is, the receiver 5 may be constructed without providing the identification coded EPG data storage section 63.

Accordingly, while the preferred embodiment has been described, variations thereto will occur to those skilled in the art within the scope of the present inventive concepts which are delineated by the following claims.

What is claimed is:

1. An information processor for processing electronic program guide information having program descriptions therein, comprising:

receiving means for receiving at least said electronic program guide information and program descriptions; and inserting means for inserting into a program description of said electronic program guide information identification codes for identifying key words in said program description;

wherein upon receipt of said electronic program guide information including said identification codes, said electronic program guide information is stored in a table according to said identification codes, said program descriptions comprise at least text information, and said identification codes comprise identifiers for identifying the position of the key words within said program descriptions of said text information, and classification information for classifying each of the key words.

2. The information processor according to claim 1, wherein said inserting means inserts identification codes for identifying key words of said text information according to the content of said text information.

3. The information processor according to claim 2, wherein said identification codes include a plurality of types corresponding to the key words of said text information, and said inserting means inserts said identification codes corresponding to the contents of said key words of said text information into said program descriptions of said electronic program guide information.

4. The information processor according to claim 1, wherein said classification information is arranged in a hierarchical structure.

5. The information processor according to claim 1, further comprising transmitting means for transmitting said electronic program guide information including said program descriptions in which said identification codes have been inserted together with program data.

6. An information processing method for processing electronic program guide information having program descriptions therein, comprising the steps of:

receiving at least electronic program guide information having program descriptions therein, and inserting into said program descriptions of said electronic program guide information identification codes for identifying key words of said program descriptions;

wherein upon receipt of said electronic program guide information including said identification codes, said electronic program guide information is stored in a table according to said identification codes, said program descriptions comprise at least text information, and said identification codes comprise identifiers for identifying the position of the key words within said program descriptions of said text information, and classification information for classifying each of the key words.

7. An information processor for processing transmitted data including electronic program guide information having program descriptions therein and identification codes inserted in said program descriptions of said electronic program guide information for identifying key words of said program descriptions, comprising:

separating means for separating said electronic program guide information from said transmitted data;

sampling means for sampling said key words of a program description identified by said inserted identification codes; and processing means for implementing predetermined processes based on the sampling result of said sampling means;

wherein upon receipt of said electronic program guide information including said identification codes, said electronic program guide information is stored in a table according to said identification codes, said program descriptions comprise at least text information, and said identification codes comprise identifiers for identifying the position of the key words within said program descriptions of said text information, and classification information for classifying each of the key words.

8. The information processor according to claim 7, wherein said identification codes identify key words of said text information according to the content of said text information.

9. The information processor according to claim 8, wherein said inserted identification codes include a plurality of types corresponding to said key words of said text information.

10. The information processor according to claim 7, wherein said processing means controls display of said key words in displaying said electronic program guide information and program descriptions.

11. The information processor according to claim 7, wherein said processing means is operable to retrieve said key words or said program descriptions of said electronic program guide information containing said key words.

12. An information processing method for processing transmitted data including electronic program guide information having program descriptions therein and identification codes inserted into said program descriptions of said electronic program guide information for identifying key words of said program descriptions, comprising the steps of:

separating said electronic program guide information from said transmitted data;

sampling said key words of a program description identified by said inserted identification codes; and implementing predetermined processes based on the sampling result;

wherein upon receipt of said electronic program guide information including said identification codes, said electronic program guide information is stored in a table according to said identification codes, said program descriptions comprise at least text information, and said identification codes comprise identifiers for identifying the position of the key words within said program descriptions of said text information, and classification information for classifying each of the key words.

13. A broadcasting system comprising a transmitter for transmitting transmission data and a receiver for receiving the transmission data from said transmitter, wherein said transmitter comprises:

inserting means for inserting, into a program description of electronic program guide information, identification codes for identifying key words in said program description; and transmitting means for transmitting transmission data, including said electronic program guide information having said program descriptions therein in which said identification codes have been inserted; and said receiver comprises:

separating means for separating said electronic program guide information from said transmitted data;

sampling means for sampling said key words of a program description identified by said inserted identification codes; and processing means for implementing predetermined processes based on the sampling result of said sampling means;

wherein upon receipt of said electronic program guide information including said identification codes, said electronic program guide information is stored in a table according to said identification codes, said program description comprise at least text information, and said identification codes comprise identifiers for identifying the position of the key words within said program descriptions of said text information, and classification information for classifying each of the key words.

14. A broadcasting method for a broadcasting system comprising a transmitter for transmitting transmission data and a receiver for receiving the transmission data from said transmitter, said broadcasting method comprising the steps of:

inserting, into a program description of electronic program guide information, identification codes for identifying key words in said program description;

transmitting transmission data, including said electronic program guide information having said program descriptions therein in which said identification codes have been inserted;

separating said electronic program guide information from said received transmission data;

sampling said key words of a program description identified by said inserted identification codes; and implementing predetermined processes based on the sampling result;

wherein upon receipt of said electronic program guide information including said identification codes, said electronic program guide information is stored in a table according to said identification codes, said program description, comprise at least text information, and said identification codes comprise identifiers for identifying the position of the key words within said program descriptions of said text information, and classification information for classifying each of the key words.

* * * * *